United States Patent
Yamanaka et al.

(10) Patent No.: US 9,657,684 B2
(45) Date of Patent: May 23, 2017

(54) WASTE-HEAT REUSE CONTAINER USING WASTE HEAT OF POWER GENERATION ENGINE

(71) Applicant: Mitsubishi Heavy Industries, Ltd., Tokyo (JP)

(72) Inventors: Tomokazu Yamanaka, Tokyo (JP); Takuya Hirai, Tokyo (JP); Shuichi Shimodaira, Kanagawa (JP); Hirokazu Narita, Kanagawa (JP); Takeshi Abe, Kanagawa (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 154 days.

(21) Appl. No.: 14/440,052

(22) PCT Filed: Dec. 28, 2012

(86) PCT No.: PCT/JP2012/084201
§ 371 (c)(1),
(2) Date: Apr. 30, 2015

(87) PCT Pub. No.: WO2014/103060
PCT Pub. Date: Jul. 3, 2014

(65) Prior Publication Data
US 2015/0292434 A1    Oct. 15, 2015

(51) Int. Cl.
*F02G 5/02* (2006.01)
*F02B 3/04* (2006.01)
(Continued)

(52) U.S. Cl.
CPC .............. *F02G 5/02* (2013.01); *F01K 25/005* (2013.01); *F02B 63/04* (2013.01); *F02B 63/044* (2013.01);
(Continued)

(58) Field of Classification Search
CPC .. F02G 5/02; F02B 63/04; F02B 77/11; F02B 63/044; F01K 25/005; F24D 15/02;
(Continued)

(56) References Cited

U.S. PATENT DOCUMENTS 2,287,172 A * 6/1942 Harrison .............. B60H 1/3201
165/43
2,944,407 A * 7/1960 Pettis ...................... F25B 17/04
62/112
(Continued)

FOREIGN PATENT DOCUMENTS

CN    104718370    6/2015
EP    1426307    6/2009
(Continued)

OTHER PUBLICATIONS

First Office Action for Japanese App. No. 2014-554041, Mailed Mar. 17, 2016, 9 Pages.
(Continued)

*Primary Examiner* — Hoang Nguyen
(74) *Attorney, Agent, or Firm* — Berkeley Law & Technology Group, LLP

(57) ABSTRACT

A short waste-heat reuse container disposed adjacent to a 40-f container that contains a radiator 23, an engine 21, and a power generator 22 disposed in a longitudinal direction of the container, the waste-heat reuse container collecting waste heat of the engine and generating steam or hot water, the waste-heat reuse container containing a muffler 2 that muffles exhaust gas of the engine, a boiler 4 that transfers heat of the exhaust gas to water and generates steam, and a heat exchanger 3 that transfers heat of cooling water heated by the engine to water and generates hot water, wherein the muffler is disposed upright opposite to the boiler in the longitudinal direction of the waste-heat reuse container, an
(Continued)

exhaust gas inlet 2a of the muffler being disposed on an upper wall of the container.

7 Claims, 8 Drawing Sheets

(51) Int. Cl.
    *F24D 15/02*     (2006.01)
    *F02B 63/04*     (2006.01)
    *F01K 25/00*     (2006.01)
    *F02B 77/11*     (2006.01)

(52) U.S. Cl.
    CPC .............. *F02B 77/11* (2013.01); *F24D 15/02* (2013.01); *F24D 2200/29* (2013.01); *F24H 2240/06* (2013.01); *Y02E 20/14* (2013.01); *Y02T 10/166* (2013.01)

(58) Field of Classification Search
    CPC . F24D 2200/29; F24H 2240/06; Y02E 20/14; Y02T 10/166
    USPC ......................................... 60/618; 122/4 R, 7
    See application file for complete search history.

(56) References Cited

U.S. PATENT DOCUMENTS

| | | | | |
|---|---|---|---|---|
| 4,509,464 | A * | 4/1985 | Hansen | F02B 1/02 123/1 A |
| 2003/0033994 | A1 | 2/2003 | Campion | |
| 2004/0104577 | A1 | 6/2004 | Alger | |
| 2005/0120715 | A1 * | 6/2005 | Labrador | F01K 27/00 60/618 |
| 2011/0185712 | A1 * | 8/2011 | Burns | F28F 1/10 60/320 |
| 2014/0165562 | A1 * | 6/2014 | Nagai | F01P 7/165 60/615 |

FOREIGN PATENT DOCUMENTS

| | | |
|---|---|---|
| JP | 5622556 A | 3/1981 |
| JP | H04156250 A | 5/1992 |
| JP | 5296008 A | 11/1993 |
| JP | H07232879 A | 9/1995 |
| JP | 2004263589 A | 9/2004 |
| JP | 2005042600 A | 2/2005 |
| JP | 2005076592 A | 3/2005 |
| JP | 2008243591 A | 10/2008 |
| JP | 2008247576 A | 10/2008 |
| JP | 2014016124 A | 1/2014 |
| RU | 50256 U1 | 12/2005 |
| RU | 2340785 C1 | 12/2008 |
| WO | 2014103060 A1 | 7/2014 |

OTHER PUBLICATIONS

Notification of Fulfilling of Registration Formality, App No. 201280076454.6, Date of Issue May 9, 2016, 4 Pages.
Decision on Grant, App. No. 2015116646/20(025859), Filed Dec. 23, 2012, 13 Pages.
Decision to Grant a Patent, App. No. JP2014-554041, Drafting Date Sep. 27, 2016, Mailed Oct. 7, 2016, 6 Pages.
EP 2910762/App No. 12890985/PCT/JP2012/084201: Supplementary European Search Report, Oct. 23, 2015, 5 pages.
CN104718370/App No. CN2012876454: First Office Action, English Translation, Aug. 21, 2015, 4 pages.
Notification of Receipt of Record Copy, App. No. PCT/JP2012/084201, Filed Dec. 28, 2012, Mailed Jan. 22, 2013, 1 Page.
International Search Report, App. No. PCT/JP2012/084201, Filed Dec. 28, 2012, Mailed Feb. 5, 2013, 4 Pages.
Notification Concerning Transmittal of International Preliminary Report on Patentability, App. No. PCT/JP2012/084201, Filed Dec. 28, 2012, Mailed Jul. 9, 2015, 10 Pages.

* cited by examiner

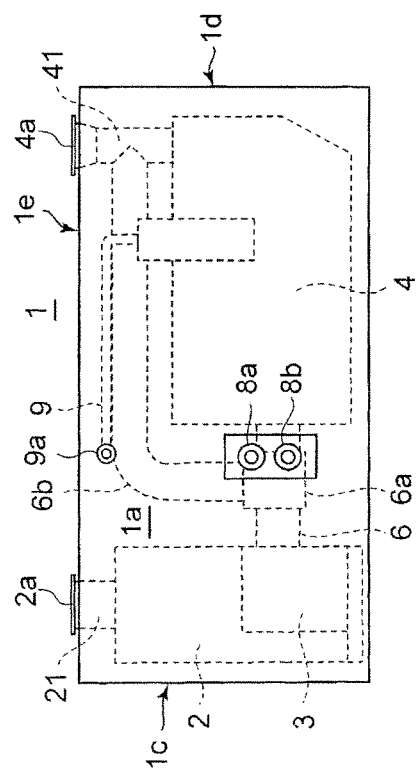
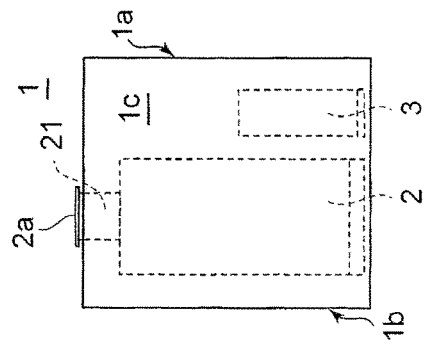
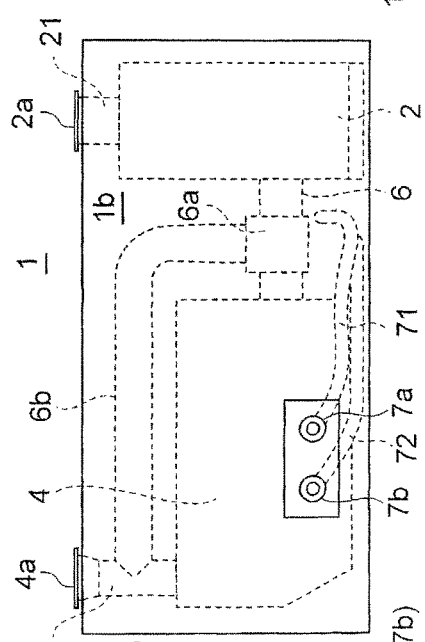
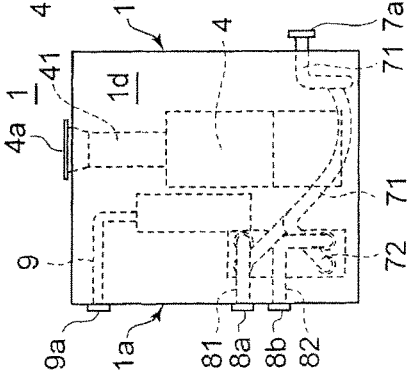

WASTE-HEAT REUSE CONTAINER USING WASTE HEAT OF POWER GENERATION ENGINE

TECHNICAL FIELD

The present invention relates to a container incorporated with a co-generation type engine power generation device, in particular, to a waste-heat reuse container connected to a power generation container that contains power generation components including an engine and a power generator driven by the engine, the waste-heat reuse container containing a boiler and a heat exchanger that generate steam and hot water using waste heat of the engine.

BACKGROUND

An engine power generation device that has an engine and a power generator driven by the engine is known. The engine power generation device can be easily installed when power shortage occurs or power load increases. In addition, since the engine power generation device is a distributed power generator, it does not need a power grid. Thus, the demand for the engine power generation device is increasing in newly developing countries. Even in advanced countries, emergency power is required in preparation for disasters. Thus, the demand for the engine power generation device is increasing domestically and globally.

However, although the demand for the distributed engine power generation device is increasing, skilled assembling workers unevenly distribute especially in developing countries. Although major components such as an engine and a power generator are unitized, the unitized engine and generator have to be connected with pipes and so forth on site. In addition, the skills of assembling workers largely vary country by country. Even in the same country, the skills of assembling workers vary region by region Assembling times vary depending on the skills of assembling workers.

Although major components of the engine power generation device are unitized, since the engine power generator device is a middle-size power supply, it takes some days for assembling and adjusting the engine power generation device. Thus, such an engine power generation device does not satisfy emergency power demand in disasters.

In addition, although the major components are unitized, they have to be connected with pipes and cables. Thus, when the engine power generation device is assembled, pipes and cables have to be inevitably routed.

To solve such drawbacks, a technique in which a container for marine transportation, land transportation, or air transportation is used for the engine power generation device, namely a container loading device in which an engine and a power generator driven by the engine are disposed adjacently in a container, is disclosed to as to allow the device not to be assembled and adjusted on site (this technique is an underlying technique of Patent Literature 1).

However, if a plurality of units such as an engine and a power generator is contained in one container, exhaust gas has to be discharged out of the container. As described in Patent Literature 1, a silencer (muffler) has to be disposed on an upper wall of the container above the engine through an L-shaped pipe. However, in this case, only the muffler protrudes from the upper wall of the container. As a result, an overall height of the container becomes greater than the limit specified by the relevant standard. Thus, a truck that carries the container may not travel on public roads.

Thus, the muffler is normally designed to be dismounted from the container. When the device is assembled on site, the muffler is mounted on the device. In this case, the number of assembling steps on site increases. In addition, since the muffler protrudes outside the container, the muffler is likely to vibrate and make noise while the engine power generation device is operating.

Even if the engine power generation device uses a highly efficient gas engine, since it uses natural gas-fossil fuel, from a point of view of energy saving and $CO_2$ saving, co-generation that effectively uses exhaust gas of the engine and waste heat of cooling water has to be considered.

Thus, many power generation devices that use co-generation have been developed. In these device, waste heat of the engine is actively used. Heat of exhaust gas is transferred to a boiler. The boiler generates steam. In addition, cooling water is heated by the engine. Heat of the cooling water is transferred to a heat exchanger. The heat exchanger transfers heat of the cooling water heated by the engine to clean water and generates hot water (refer to Patent Literature 2).

However, sizes of containers loaded on ships, trucks, and so forth are generally standardized and specified by the ISO standard. According to the standard, there are only two sizes of the containers—20 f (6 m) and 40 f (12 m) (although containers having a length of 45 f have been standardized, they cannot be conveyed under the current Japanese Traffic Laws). In addition, the width and height of containers are standardized as 8 f (2.4 m) and 8.6 f (2.6 m), respectively. Thus, in containers having a length of 40 f (12 m) and a length of 20 f (6 m) that can be conveyed on Japanese public roads, they are long in a longitudinal direction, but they have a narrow width of 8 f (2.8 m) and a low height of 8.6 f (2.6 m).

If a long container having a length of 40 f contains a hot water generating heat exchanger that generates hot water and a boiler that generates steam as well as an engine and a power generator, the space for the engine has to be accordingly decreased. Thus, the rating of the engine power generation device is unavoidably lowered in comparison with the space of the container. As a result, if many units such as the boiler and the heat exchanger as well as the engine and the power generator are disposed in the longitudinal direction of the container, since the units contained in the container have to become small, the required power output cannot be obtained.

CITATION LIST

Patent Literature

Patent Document 1: JP2008-247576A, Publication
Patent Document 2: JP2004-263589A, Publication

SUMMARY

Technical Problem

From the foregoing view of the technical problem, the individual units are functionally separated into two containers. An ordinary power generation functional section including an engine and a power generator driven by the engine is contained in one long (40 f) container to obtain a required power output. A boiler and a heat exchanger that use waste heat of the engine are contained in a 20-f container that is half the 40-f container so as to effectively use an installation area.

A short container including a 20 ft container that contains waste-heat reuse units is referred to as a waste-heat reuse container.

The present invention is a waste-heat reuse container that is a short container and that contains waste-heat reuse units such as a boiler and a heat exchanger and that functions as a space-saving co-generation container that does not have to route pipes and cables and that improves the maintenance performance for the assembled units.

According to the present invention, two containers are provided. One of these containers contains a power generation functional section and is a basic long container (mono-generation container). Another container contains a boiler that generates steam and a heat exchanger that generates hot water and is a short 20-f container that functions as a co-generation container. An engine muffler is normally contained in a power generation container. However, according to the present invention, the engine muffler is contained in the waste-heat reuse container that functions as the co-generation container. If a muffler is contained in the mono-generation container, the muffler unavoidably protrudes upward. However, according to the present invention, since the muffler is contained in the waste-heat reuse container that functions as a co-generation container, the problem in which the muffler protrudes upward does not occur.

The present invention provides a waste-heat reuse container that can be accurately connected to the mono-generation container and that allows a pipe system to be accurately connected to the mono-generation container.

The present invention also provide a waste-heat reuse container that allows a boiler, a heat exchanger, and a muffler that are contained in the container to be accurately mounted and dismounted and that allows them to be assembled space-savingly and improves the maintenance performance for the assembled units.

Solution to Problem

To solve the foregoing problem, the present invention is a waste-heat reuse container disposed adjacent to a power generation container that contains a radiator, an engine, and a power generator, the waste-heat reuse container collecting waste heat of the engine and generating steam or hot water, a length of the waste-heat reuse container being smaller than that of the power generation container, the waste-heat reuse container containing a muffler that muffles exhaust gas of the engine, a boiler that transfers heat of the exhaust gas to water and generates steam, and a heat exchanger that transfers heat of cooling water heated by the engine to water and generates hot water.

According to the present invention, a muffler is not contained in a mono-generation container that contains an engine, but rather in a short waste-heat reuse container. In addition, since the muffler does not protrude upward, a truck that loads the long power generator container containing the engine is likely to freely travel on public roads.

In addition, since the long power generation container does not have to contain the muffler, installation flexibility and space for the engine increase. As a result, the engine can be installed at any place in the long power generation container.

In this case, the muffler is desirably disposed upright in the waste-heat reuse container. An exhaust gas inlet of the muffler is desirably disposed on an upper wall of the waste-heat reuse container.

According to the present invention, since the muffler is not horizontally disposed in the longitudinal direction of the waste-heat reuse container, but rather disposed upright in the vertical direction of the container, the muffler can be disposed in the most space-saving manner. In addition, the boiler adjacent to the muffler in the longitudinal direction of the container can be disposed in a large space. Although exhaust gas emitted from the engine is muffled and cooled by the muffler, the boiler can generate steam having a temperature of around 150° C.

The waste-heat reuse container contains a boiler that transfers heat of the exhaust gas muffled by the muffler to water and generates steam or a heat exchanger that transfers heat of cooling water heated by the engine to water and generates hot water. A center axis of a pipe that connects the boiler and the muffler is straight in a longitudinal direction of the waste-heat reuse container. Thus, the pipes can be connected in the shortest distance.

When the short waste-heat reuse container is combined with the long power generation container, the muffler is disposed on the other end in the longitudinal direction of the waste-heat reuse container and nearly at a nearly center position in the longitudinal direction of the long (40 f) power generation container used as the mono-generator.

Since the engine that is heavier than the other units in the power generation container is disposed nearly at a center position in the longitudinal direction of the long power generation container, when the long power generation container is hung by a crane or the like, the container is well-balanced.

When the long power generation container is disposed adjacent to the short waste-heat reuse container as shown in FIG. 6 and FIG. 7, since the muffler contained in the waste-heat reuse container faces the engine contained in the long power generation container, the exhaust port of the engine and the inlet of the muffler are connected with a shortest straight pipe perpendicular to the longitudinal direction of the long power generation container and the short waste-heat reuse container.

According to the present invention, double hinged doors are disposed on each transverse wall on both ends in the longitudinal direction of the waste-heat reuse container so as to open the transverse wall.

According to the present invention, the double hinged doors are disposed on both sides in the transverse direction of the waste-heat reuse container. When the boiler is disposed on one end in the longitudinal direction of the waste-heat reuse container and the muffler and the heat exchanger are disposed on the other end in the longitudinal direction of the waste-heat reuse container, these units can be easily dismounted and mounted again. As a result, the maintenance performance and reassembling performance for the units contained in the waste-heat reuse container are improved.

In other words, the boiler is disposed on one end in the longitudinal direction of the waste-heat reuse container. The muffler that muffles the exhaust gas and the heat exchanger that transfers heat of the cooling water heated by the engine to water and generates hot water are disposed on another end in the longitudinal direction and on both sides in the transverse direction of the waste-heat reuse container. As a result, a structure of units that can be very effectively maintained and mounted again can be used.

According to the present invention, an inlet and an outlet for cooling water heated by the engine and cooled by the heat exchanger are disposed on an inner wall of opposite walls in the longitudinal direction of the waste-heat reuse container. In addition, an inlet and an outlet for clean water heated by the heat exchanger are disposed on an outer wall of the opposite walls in the longitudinal direction of the waste-heat reuse container.

According to the present invention, since the inlet and outlet of cooling water heated by the engine contained in the long power generation container are disposed on each of the opposite walls of the long power generation container and the short waste-heat reuse container, connection pipes that connect the corresponding inlets and outlets between the power generation container and the waste-heat reuse container become the shortest. Thus, the pipes are unlikely to be routed outside the containers In addition, since the inlet and outlet of clean water for the heat exchanger are disposed on the front longitudinal wall of the waste-heat reuse container, namely the front longitudinal wall does not face the long power generation container, the inlet and the outlet can be easily connected to a hot water pipe system.

Advantageous Effects

Thus, according to the present invention, since the foregoing units are separated into two containers, the volumes of the containers can be effectively used. In addition, the ratings of the engine and the power generator contained in the long (40-f) container can be increased.

In addition, the present invention can provide a waste-heat reuse container that is the 20-f container that contains waste-heat reuse units such as a boiler and a heat exchanger and that functions as a space-saving co-generation container that does not have to route pipes and cables and that improves the maintenance performance for the assembled units.

According to the present invention, an ordinary power generation functional section that functions as an engine power generator that includes an engine and a power generator driven by the engine is contained in one long (40 f) container as a long power generation container. The container contains a middle size power unit that outputs desired power. In addition, a boiler that uses waste heat of the engine and a heat exchanger are desirably contained in a short waste-heat reuse container whose length is half the 40-f power generation container. As a result, the containers can be effectively used. In addition, the waste-heat reuse container improves the layout performance for the long power generation container and allows the pipe system to be accurately connected to the long power generation container.

BRIEF DESCRIPTION OF DRAWINGS

FIGS. 2(A) to 2(D) are four views of the waste-heat reuse container: 2(A) is a front view; 2(B) is a rear view; 2(C) is a left-side view; and 2(D) is a right-side view.

DETAILED DESCRIPTION

Embodiments of the present invention will now be described in detail with reference to the accompanying drawings. It is intended, however, that unless particularly specified, dimensions, materials, shapes, relative positions and the like of components described in the embodiments shall be interpreted as illustrative only and not limitative of the scope of the present invention.

First, with reference to FIGS. 1(A), 1(B) and FIGS. 2(A) to 2(D), a short waste-heat reuse container (20-f container) according to an embodiment of the present invention will be described.

A 20-f container 1 is formed in a rectangular parallelepiped shape. According to the ISO standard, the length, width, and height of the 20-f container 1 are specified as 20 f (6 m), 8 f (2.4 m), and 8.6 f (2.6 m), respectively.

Figure 1A:
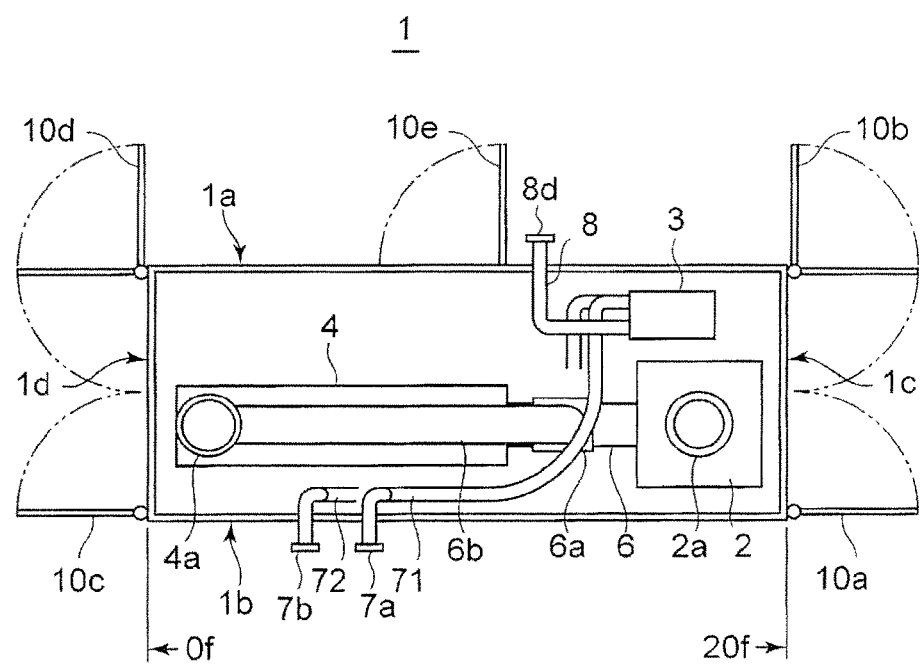
FIGS. 1(A) and 1(B) are two views of a short waste-heat reuse container that contains waste-heat reuse units according to an embodiment of the present invention: 1(A) is a plan view showing an inner structure of the container; and 1(B) is a right-side perspective view showing the container.
Figure 1B:
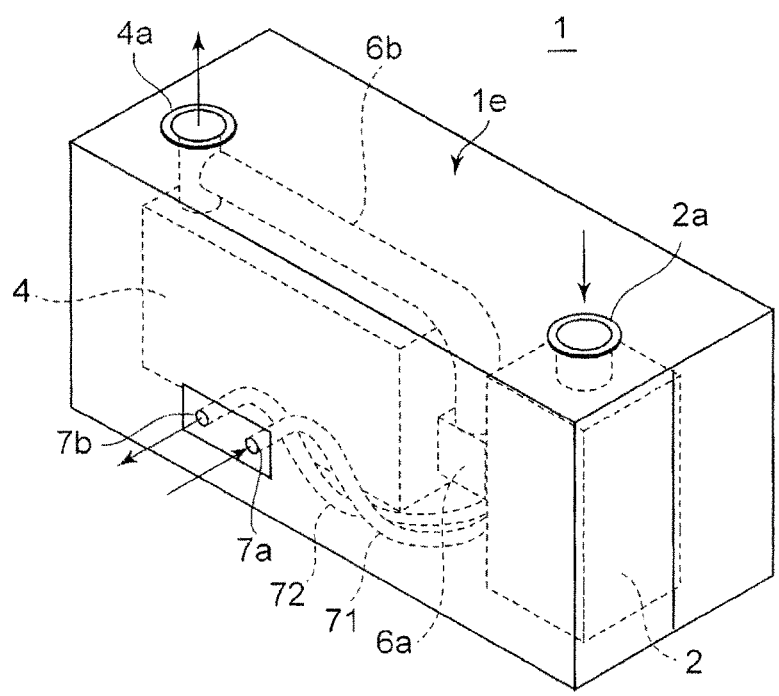

When the walls of four sides of the 20-f container 1 are specified based on FIG. 1(A), a longitudinal wall disposed atop the figure is a front longitudinal wall 1a; a longitudinal wall opposite to the front longitudinal wall 1a is a rear longitudinal wall 1b; a transverse wall disposed on the right of the front longitudinal wall 1a is a 20-f transverse wall 1c; a transverse wall opposite to the 20-f transverse wall is a 0-f transverse wall 1d; and an upper wall 1e.

Disposed on the transverse walls 1c and 1d are a pair of double hinged doors 10a and 10b and a pair of double hinged doors 10c and 10d that are opened from center positions of the transverse walls 1c and 1d so that each units contained in the 20-f container 1 are dismounted and mounted again in the longitudinal direction of the container. The double hinged doors on the front longitudinal wall 10a and 10c (1a) are opened by 90° because the 40-f container 20 is disposed adjacent to the front longitudinal wall 1c. On the other hand, the double hinged doors on the rear longitudinal wall 10b and 10c (1b) are opened by 180°. In addition, a single hinged door 10e is disposed at a center portion of the rear longitudinal wall 1b. As a result, a longitudinal surface of a boiler 4 and pipes for cooling water and hot water connected to the heat exchanger that cannot be accessed through the pair of double hinged doors 10a and 10b and the pair of double hinged doors 10c and 10d disposed on the transverse walls 1c and 1d can be easily maintained.

In a 20-f end container space surrounded by the 20-f transverse wall, the front longitudinal wall 1a, and the rear longitudinal wall 1b, a muffler 2 is disposed upright adjacent to the front longitudinal wall 1a. The muffler 2 muffles noise of exhaust gas of an engine 21. An exhaust gas inlet 2a of the muffler 2 is connected to the upper wall of the container. A connection pipe 101 that connects an exhaust gas outlet 21a disposed nearly at a center portion of an upper wall of a 40-f container 20 (that will be described later) and the exhaust gas inlet 2a of the muffler 2 disposed on the upper wall of the 20-f container 1 is disposed above the containers. Thus, the muffler 2 can be securely and safely assembled and maintained. In addition, a heat exchanger 3 that transfers head of cooling water heated by the engine 21 to water and generates hot water is disposed adjacent to the rear longitudinal wall 1b, the muffler 2, and the transverse wall 1c.

A boiler 4 that receives exhaust gas muffled by the muffler 2 and that generates steam is disposed adjacent to the front longitudinal wall 1a, the muffler 2, and the transverse wall 1d. Exhaust gas emitted from the boiler 4 is guided to an exhaust gas outlet disposed upright along the 0-f transverse wall. The exhaust gas outlet is connected to the upper wall of the container.

Thus, the exhaust gas muffled by the muffler 2 can be further muffled by the boiler 4. As a result, when the containers according to the present invention are disposed outdoor, noise that is generated in the containers can be minimized.

In addition, a connection pipe 6 that supplies exhaust gas from the muffler 2 to the boiler 4 is straightly connected therebetween through a dumper 6a in the longitudinal direction. A bypass pipe 6b that bypasses exhaust gas separated by the dumper 6a passes along an upper wall of the boiler 4 to an exhaust gas outlet 4a.

A signal detection pipe 9 sends signals about a steam pressure and a temperature in the boiler 4 to the 40-f container through a detection port 9a so as to control an opening ratio of the dumper.

An inlet 7a and an outlet 7b of pipes 7 for cooling water heated by the engine 21 and cooled by the heat exchanger 3 are adjacently disposed on the rear longitudinal wall 1b so that the inlet 7a and the outlet 7b are offset on the side of the 20-f transverse wall 1d.

Connected to the heat exchanger 3 are an inlet pipe 71 and an outlet pipe 72 for clean water heated by the heat exchanger 3 and hot water supplied to a load side. These pipes 71 and 72 pass through a space formed below the connection pipe 6 between the muffler 2 and the boiler 4 toward the front longitudinal wall 1a. A hot water supply outlet 8a and a clean water inlet 8b are disposed on the front longitudinal wall 1a.

Figure 3:
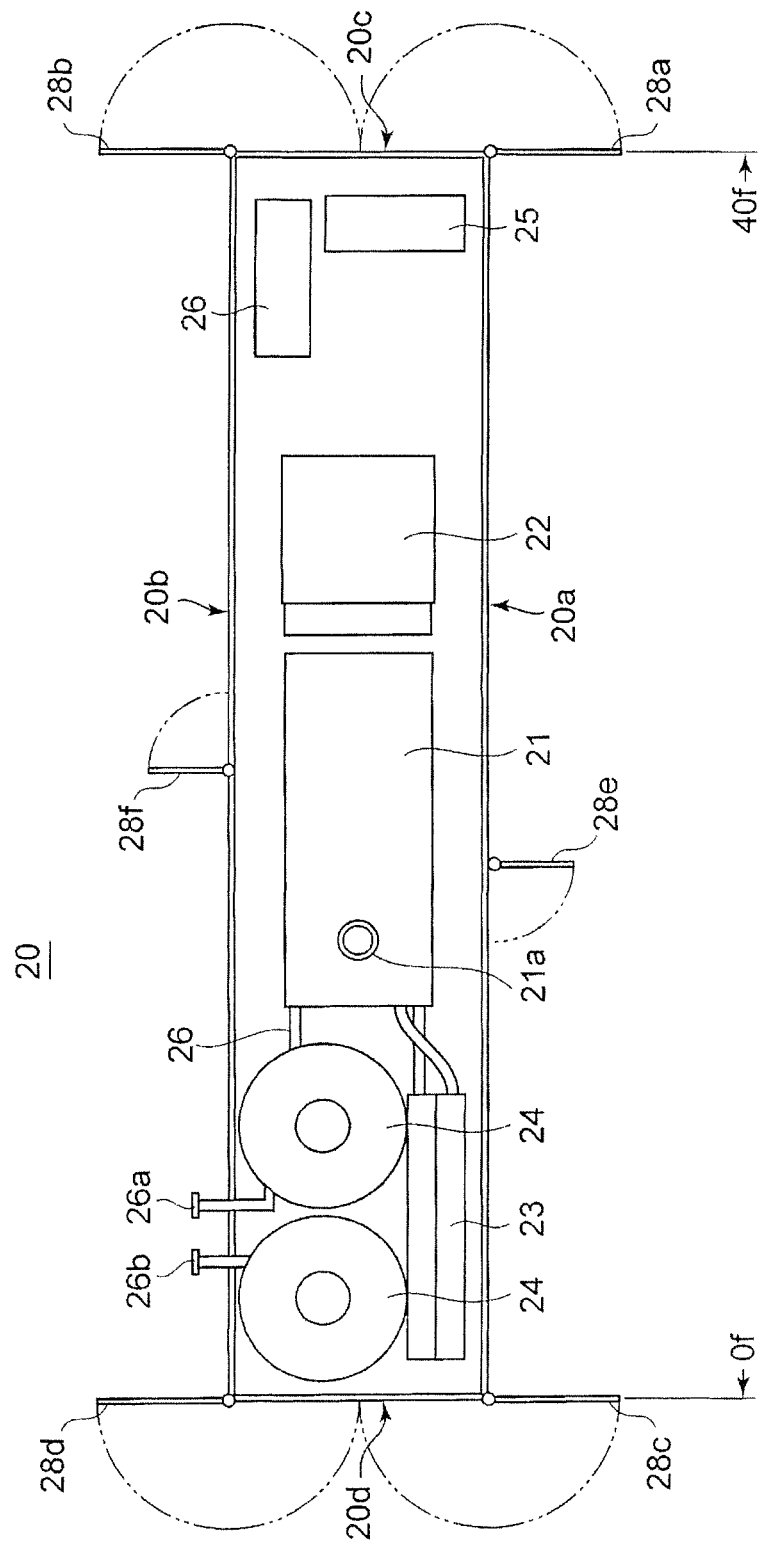
FIG. 3 is a plan view showing an inner structure of a long power generation container according to the embodiment of the present invention, the power generation container containing a power generation functional section including an engine, a radiator, and a power generator.
Figure 4:
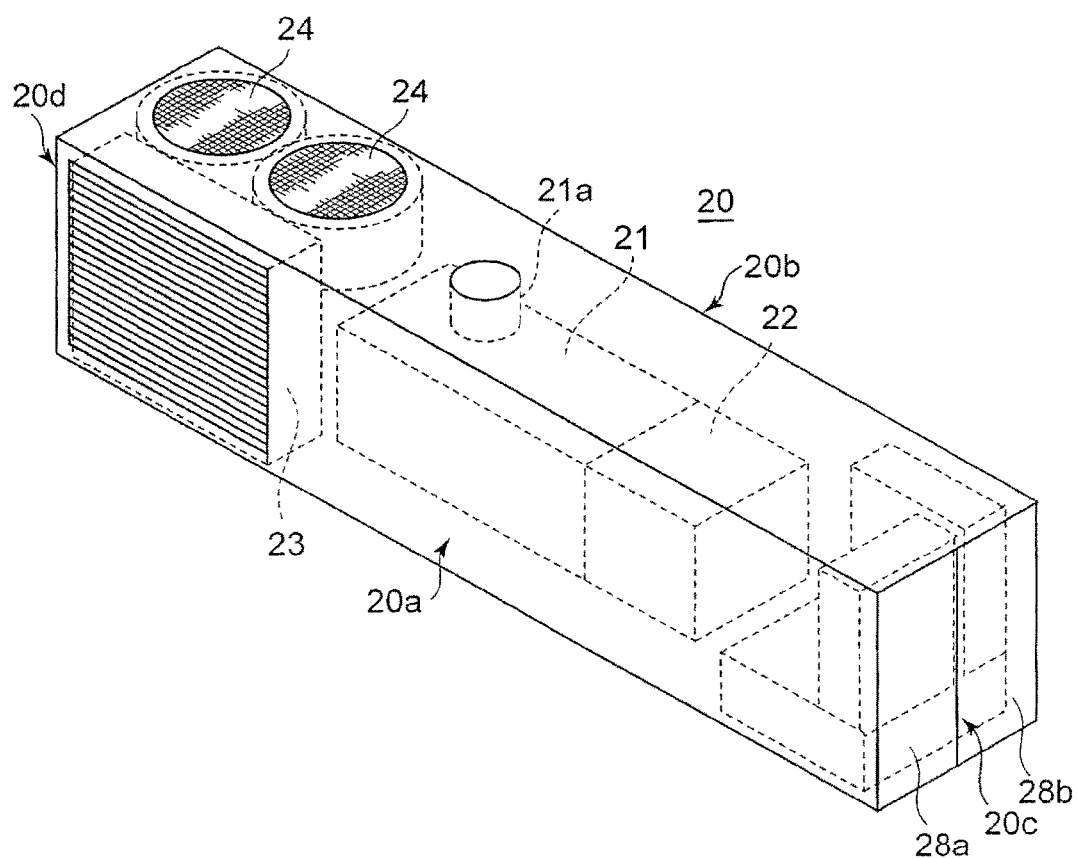
FIG. 4 is a front perspective view showing the power generation container shown in FIG. 3.
Figure 5:
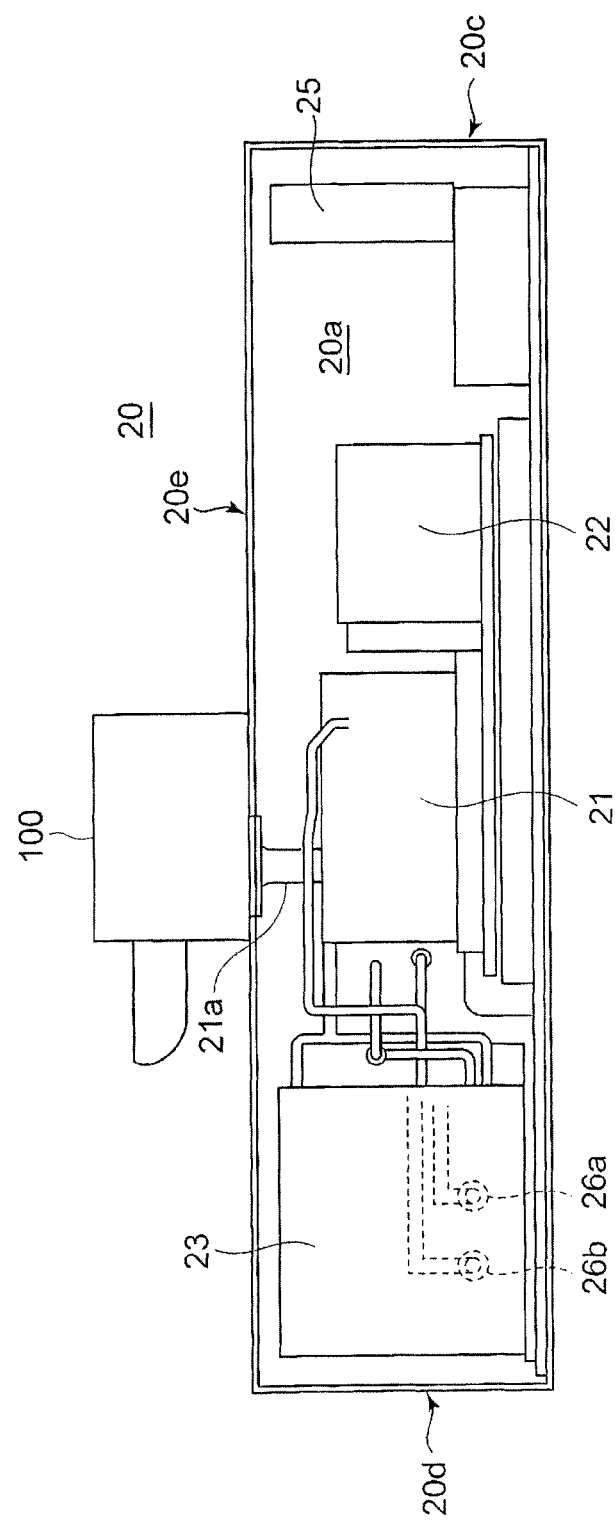
FIG. 5 is a front view showing an inner structure of the power generation container shown in FIG. 3.

With reference to FIG. 3 to FIG. 5, the 40-f container (long power generation container) will be described.

The 40-f container 20 is formed in a rectangular parallelepiped shape. The length, width, and height of the 40-f container 20 are specified as 40 f (12 m), 8 f (2.4 m), and 8.6 f (2.6 m), respectively.

When the walls of four sides of the 40-f container 20 are specified based on FIG. 3, a longitudinal wall on the right of the figure is a front longitudinal wall 20a; a longitudinal wall on the left (opposite side) of the figure is a rear longitudinal wall 20b; a transverse wall at the bottom of the front longitudinal wall 20a is a 40-f transverse wall 20c; a transverse wall opposite to the 40-f transverse wall 20c is a 40-f transverse wall 20d; and an upper wall 20e.

Disposed on the transverse walls 20c and 20d are a pair of double hinged doors 28a and 28b and a pair of double hinged doors 28c and 28d that are opened from center positions of the transverse walls 20c and 20d so that each units (engine 22, power generator 22, radiators, controller, and so forth) contained in the 40-f container 20 are dismounted and mounted again. The pair of double hinged doors 28a and 28b and the pair of double hinged doors 28c and 28d on the front longitudinal wall and the rear longitudinal wall 20b are opened by 180°.

In the 40-f container, unlike the 20-f container 1, the pair of double hinged doors 28a and 28b and the pair of double hinged doors 28c and 28d are opened by 180° because the adjacent container (20-f container 1) do not interfere with these double hinged doors that are opened. In addition, single hinged doors 28e and 28f are disposed at center portions on the longitudinal walls so that the engine 21 can be easily maintained.

An exhaust gas outlet 21a of the engine 21 is disposed nearly at a center portion of the upper wall of the container, desirably with an offset on the side of the 0-f transverse wall 20d. A silencer 100 is disposed on the upper wall 20e through an L-letter shaped pipe when the 40-f container 20 is used in the mono-generation structure without the 20-f container.

The engine 21 is disposed nearly at a center position in the longitudinal direction in the inner space of the 40-f container 20, desirably at a position in a range of 20 f±10 f from the center position in the longitudinal direction of the 40-f container 20. The engine 21, which is heavier than other units in the 40-f container 20, is disposed at the center position in the longitudinal direction of the 40-f container 20. A plurality of radiators 23 is disposed in a space formed between the engine 21 and the 40-f transverse wall.

Two cooling fans 24 are disposed in a space formed between the plurality of radiators 23 and the rear longitudinal wall so that the fans 24 blow cooling wind to the radiators 23.

An outlet 26a and an inlet 26b for cooling water heated by the engine 21 and cooled by to the heat exchanger 3 are disposed on the rear longitudinal wall 20b adjacent to the radiators 23. Cooling water pipes 26 are connected between the radiators 23 and the engine 21.

The pair of double hinged doors 20a and 28b and the pair of the double hinged doors 28c and 28d are disposed respectively on the transverse walls 20c and 20d on both the ends in the longitudinal direction of the container so that the transverse walls 20c and 20d can be fully opened and that the engine 21 and the power generator 22 can be dismounted. A control panel 25 is disposed inside the pair of double hinged doors 28a and 28b of the 40-f transverse wall so that the control panel 25 faces the power generator 22.

In other words, the power generator 22 is disposed adjacently on the other end (40-f end) in the longitudinal direction of the engine 21. Shafts of the engine 21 and the power generator 22 are connected so that drive force of the engine 21 is transferred to the power generator 22.

In addition, the control panel 25 and the lubricant tank 26 are adjacently disposed in a space formed between the power generator 22 and the 40-f transverse wall so that the control panel 25 and the coolant tank 26 face the double hinged doors 28a and 28b.

Next, an effective layout of a co-generation container in combinations of the 40-f container 20 (power generation container) and the 20-f container 1 (waste-heat reuse container) will be described.

With reference to FIG. 6 to FIGS. 8(A) to 8(C), a layout of the 20-f container 1 and the 40-f container 20 that minimize their installation space and lengths of pipes and cables will be described.

Figure 8A:
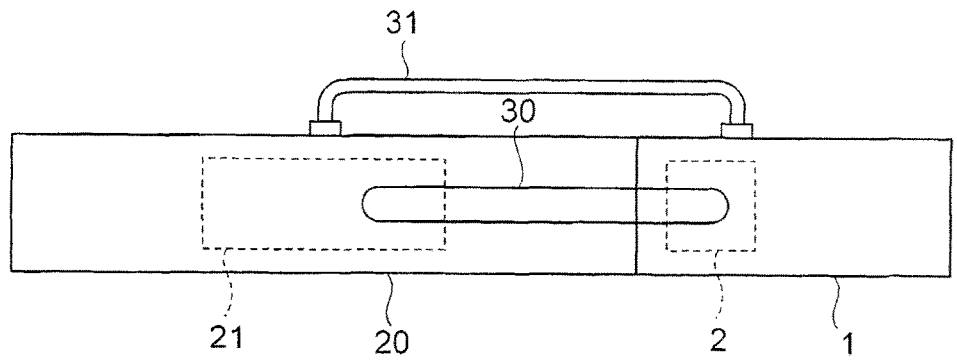
FIGS. 8(A) to (C) are plan views showing other exemplary layouts of connections of the short waste-heat reuse container and the long power generation container, in particular, an inner structure of the containers.

First, as shown in FIG. 8(A), the 40-f end of the 40-f container 20 is connected with the 0-f end of the 20-f container 1 so that they are disposed in their longitudinal direction.

In this layout, although the length of the containers is 60 f, the width of the containers is 8 f (2.4 m). If an installation space for a power supply has an area whose one side is around 20 m or greater, since the width of the containers is as narrow as 8 f, it is desirable that a plurality of co-generation power supply devices should be densely disposed.

However, when the container 1 and the container 20 are connected in the longitudinal direction, the exhaust gas outlet 21a disposed nearly at the center portion of the upper wall of the 40-f container 20 and the exhaust gas inlet 2a of the muffler 2 have to be connected with the connection pipe 101. To shorten the length of the connection pipe 101, the 20-f end of the 20-f container 1 has to face the 40-f end of the 40-f container 20. Since there are the engine 21, the power generator 22, and the muffler 2 between the exhaust gas outlet 21a and the exhaust gas inlet 2a, the distance between the radiators 23 disposed on the 0-f end of the 40-f container 20 and the heat exchanger 3 on the 20-f end of the 20-f container 1 inevitably becomes long. In addition, it is practically impossible to route the pipe in the longitudinal direction of the containers. Realistically, a pipe 31 is routed outside the containers along the longitudinal walls. As a result, the length and space for the pipe 31 become long and large. In addition, since the hot water pipe is routed outside the containers, if the pipe is mistakenly disconnected, it is very dangerous.

Figure 8B:
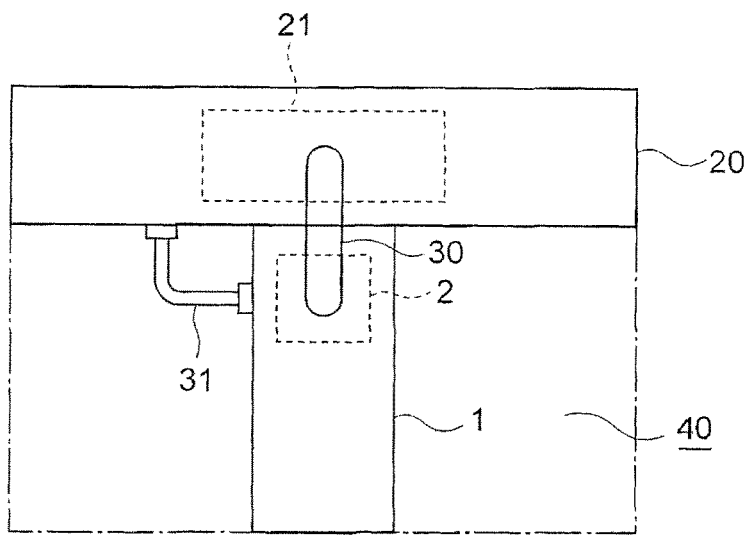

FIG. 8(B) shows a T-letter shaped layout of the containers.

In the figure, the transverse end on the side of the muffler 2 of the 20-f container 1 is connected to the center portion of the longitudinal wall adjacent to the exhaust gas outlet 21a disposed nearly at the center portion of the upper wall of the 40-f container 20 so that the 40-f container 20 and the 20-f container 1 are disposed in a T-letter shape.

In this layout, the distance between the exhaust gas outlet 21a disposed nearly at the center portion of the upper wall of the 40-f container 20 and the exhaust gas inlet 2a (of the muffler 2) disposed on the upper wall of the 20-f container 1 is remarkably decreased in comparison with the layout shown in FIG. 8(A). As a result, the length of the connection pipe 30 can be remarkably decreased. However, like the layout shown in FIG. 8(B), the pipe that connects the radiators 23 disposed on the 0-f end in the 40-f container 20 and the heat exchanger 3 disposed in the 20-f container 1 has to be routed outside the containers.

In addition, the installation space for the containers becomes (40 f (12 m)×(20 f+8 f (8.6 m)). As a result, an installation space 40 becomes large and wasteful.

Moreover, since the double hinged doors 10a and 10b of the 20-f container 1 cannot be opened, the maintenance performance for the 20-f container 1 degrades.

Figure 8C:
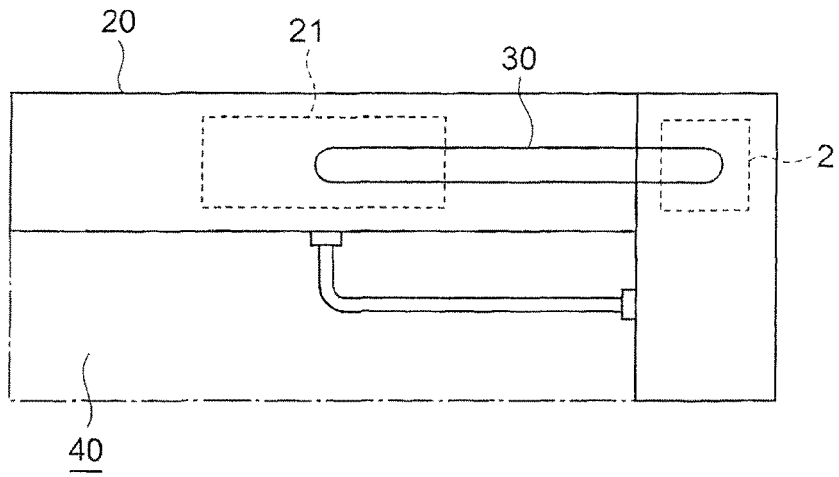

To decrease the installation space for the containers, an L-letter shaped layout shown in FIG. 8(C) may be contemplated. In this layout, a transverse end of the 40-f container 20 is connected with a longitudinal end on the side of the muffler 2 of the 20-f container 1 so that the containers are disposed in an L-letter shape. The distance between the exhaust gas outlet disposed nearly at the center portion of the upper wall of the 40-f container 20 and the exhaust gas inlet 2a (of the muffler 2) disposed in the 20-f container 1 becomes as short as around (40 f/2(6 m)+8/2 f (4.3 m)). In addition, since the containers are disposed in the L-letter shape, the installation space becomes ((40 f (12 m)+8 f (8.6 m))×(20 f–8 f (8.6 m)). Thus, the installation space 40 is still large and wasteful.

Figure 6:
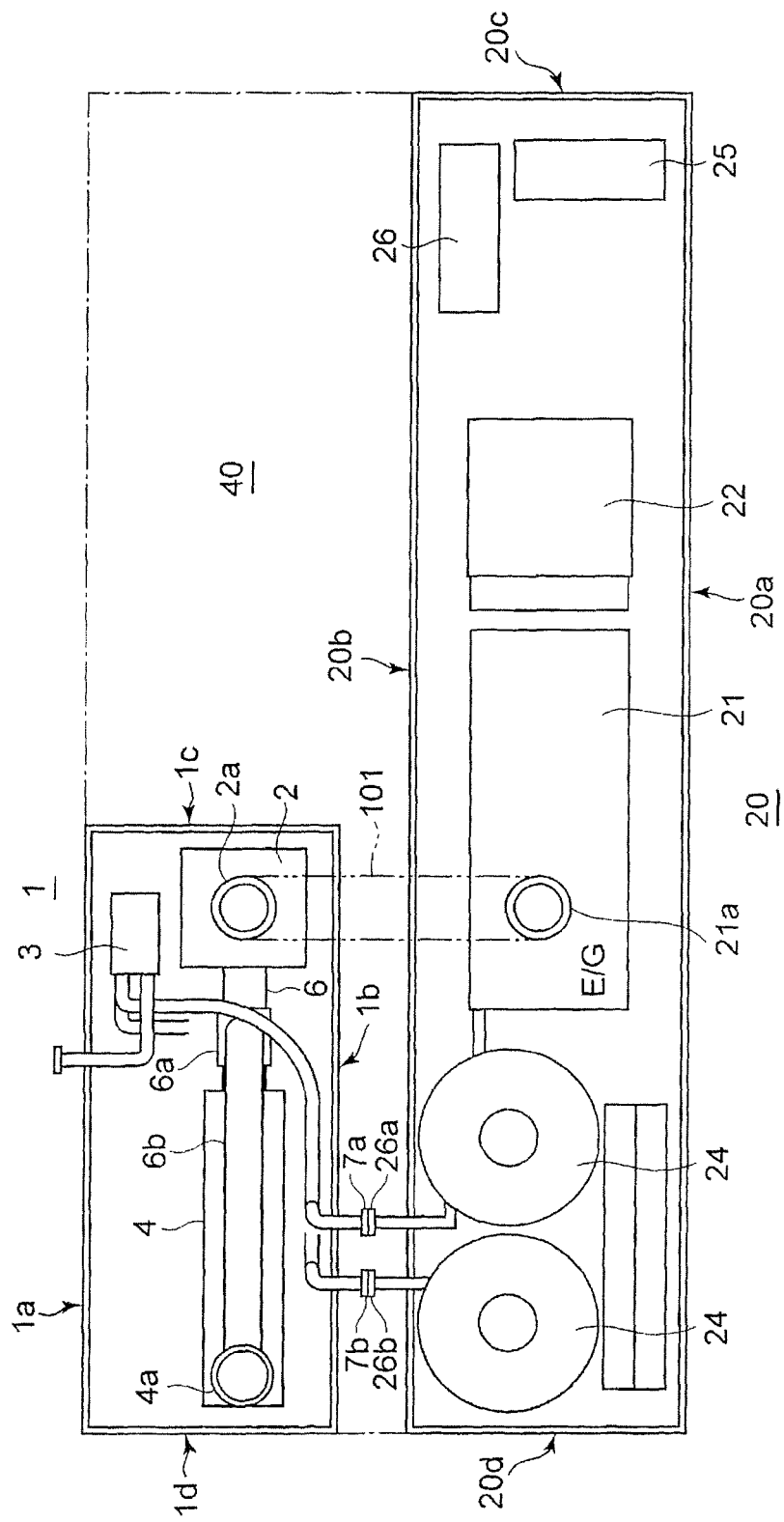
FIG. 6 is a plan view showing a container type co-generation engine power generation device according to the embodiment of the present invention, the engine power generation device in which the short waste-heat reuse container and the long power generation container are connected in a desirable layout, specifically showing an inner structure of the container type, co-generation type engine power generation device.
Figure 7:
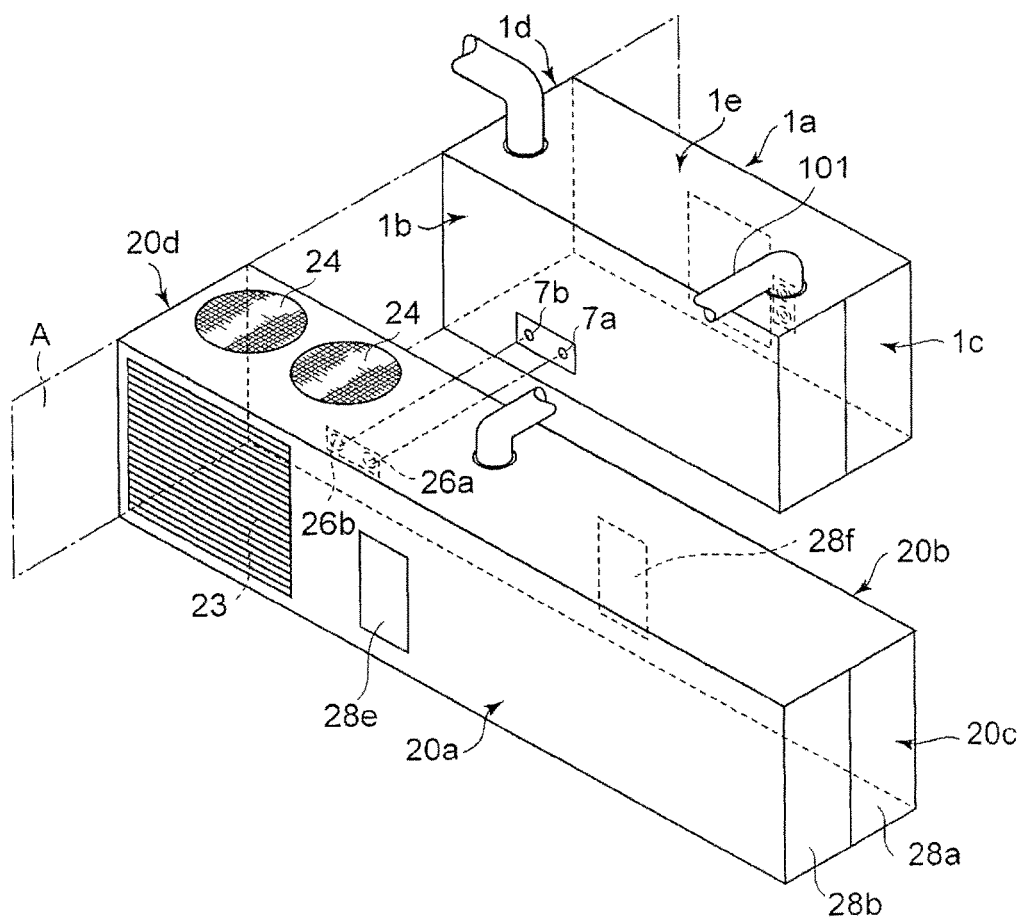
FIG. 7 is a perspective view showing the containers shown in FIG. 6.

Next, with reference to FIG. 6 and FIG. 7, a desirable layout according to the present invention will be described.

According to the present embodiment, the 40-f container 20 that is the long power generation container and the 20-f container 1 that is the short waste-heat reuse container are connected as a combination of containers so that the longitudinal walls of these containers face each other. In addition, the radiators 23 are disposed adjacently along the front longitudinal wall opposite to the rear longitudinal wall facing the 20-f container 1. Thus, as shown in FIG. 6 and FIG. 7, the length of the container installation space is the same as the length of the long power generation container, 40 f (12 m). The width of the container installation space is 8 f×2 (16 f (4.8 m)). The installation space 40 of the containers is smaller than those of the layouts shown in FIG. 8(A) and FIG. 8(B).

According to the present embodiment, the heat exchanger 3 that transfers heat of cooling water heated by the engine 21 to water and the generates hot water is disposed adjacent to the muffler 2 or disposed in a space formed between the muffler 2 and the boiler 4. In addition, since the outlet and inlet for cooling water heated by the engine 21 and cooling water cooled by the heat exchanger 3 are disposed on opposite longitudinal walls of the 40-f container 20 and the 20-f container 1, the cooling water outlet 26a of the 20-f container and the cooling water inlet 7b of the 40-f container are connected through a connection pipe. Moreover, the cooling water outlet 7b of the 20-f container 1 and the cooling water outlet 26b of the long power generation container face each other. Thus, the pipes are unlikely to be routed outside. In addition, the connection pipes may be composed of quick couplings.

According to the present embodiment, the transverse walls on both ends in the longitudinal direction of the long power generation container and the short waste-heat reuse container are composed of the open/close doors 10a to 10d. In addition, since the longitudinal walls of the containers 1 and 20 face each other, the transverse walls on both the ends in the longitudinal direction of the containers 1 and 20 become open. Thus, when the open/close doors 10a to 10d are disposed, the units contained in the containers can be easily mounted, dismounted, and maintained.

In particular, since the heat exchanger 3 and the muffler 2 are disposed adjacently in the transverse direction of the 20-f container 1, only the boiler 4 and the muffler 2 are disposed adjacently in the longitudinal direction of the container. Thus, the 20-f container 1 does not become long.

The engine is of liquid cooling type for example water cooling type or oil cooling type.

INDUSTRIAL APPLICABILITY

According to the present invention, a waste-heat reuse container is provided. The waste-heat reuse container is used along with a long basic container (mono-generation container) that contains a power generation functional section. The waste-heat reuse container—a short 20-f container—contains a boiler that generates steam and a heat exchanger that generates hot water. Since the muffler is contained in the 20-f container, the muffler does not protrude upward, the container can be safely conveyed by a truck. In addition, the long power generation container and the waste-heat reuse container can be used in combination so that the longitudinal walls of the containers face each other.

In addition, according to the present invention, the waste-heat reuse container that contains waste heat-reuse units that perform co-generation function is optionally connected with a basic container that contains a power generation functional section (hereinafter, this container is referred to as the mono-generation container). The waste-heat reuse container can be accurately connected to the mono-generation container. In addition, the waste-heat reuse container allows a pipe system to be accurately connected to the mono-generation container.

The present invention can provide the waste-heat reuse container that allows a boiler, a heat exchanger, and a muffler that are contained in the container to be accurately mounted and dismounted and that allows these units to be mounted space-savingly and improves the maintenance performance for the assembled units.

REFERENCE SIGNS LIST 1 20-f container
2 muffler
2a inlet of exhaust gas for muffler
3 heat exchanger
4 boiler
7a, 7b inlet and outlet of clean water for heat exchanger
8a, 8b inlet pipe and outlet pipe of cooling water heated by engine and cooled by heat exchanger
20 40-f container
21 engine
21a outlet of exhaust gas for engine
22 power generator
23 radiators

The invention claimed is:

1. A waste-heat reuse container disposed adjacent to a power generation container that contains a radiator, an engine, and a power generator, the waste-heat reuse container collecting waste heat of the engine and generating steam or hot water, a length of the waste-heat reuse container being smaller than that of the power generation container, the waste-heat reuse container containing:
   a muffler that muffles exhaust gas of the engine;
   a boiler that transfers heat of the exhaust gas to water and generates steam; and
   a heat exchanger that transfers heat of cooling water heated by the engine to water and generates hot water.

2. The waste-heat reuse container according to claim 1, wherein the muffler is disposed upright in the waste-heat reuse container, and
   wherein an exhaust gas inlet of the muffler is disposed on an upper wall of the waste-heat reuse container.

3. The waste-heat reuse container according to claim 1, containing:
   a boiler that transfers heat of the exhaust gas muffled by the muffler to water and generates steam; or
   a heat exchanger that transfers heat of cooling water heated by the engine to water and generates hot water,
   wherein a center axis of a pipe that connects the boiler and the muffler is straight in a longitudinal direction of the waste-heat reuse container.

4. The waste-heat reuse container according to claim 1, wherein the exhaust gas inlet of the muffler is disposed along a transverse direction perpendicular to the longitudinal direction of the waste-heat reuse container so that the exhaust gas inlet faces an exhaust gas outlet of the power generation container.

5. The waste-heat reuse container according to claim 1, wherein open/close doors are disposed on each transverse wall on both ends in the longitudinal direction of the waste-heat reuse container so as to open the transverse wall.

6. The waste-heat reuse container according to claim 1, wherein the boiler is disposed on one end in the longitudinal direction of the waste-heat reuse container, and
   wherein the muffler that muffles the exhaust gas and the heat exchanger that transfers heat of the cooling water heated by the engine to water and generates hot water are disposed on another end in the longitudinal direction and on both sides in the transverse direction of the waste-heat reuse container.

7. The waste-heat reuse container according to claim 1, wherein an inlet and an outlet for cooling water heated by the engine and cooled by the heat exchanger are disposed on an inner wall of opposite walls in the longitudinal direction of the waste-heat reuse container, and
   wherein an inlet and an outlet for clean water heated by the heat exchanger are disposed on an outer wall of the opposite walls in the longitudinal direction of the waste-heat reuse container.

* * * * *